Figure 1:
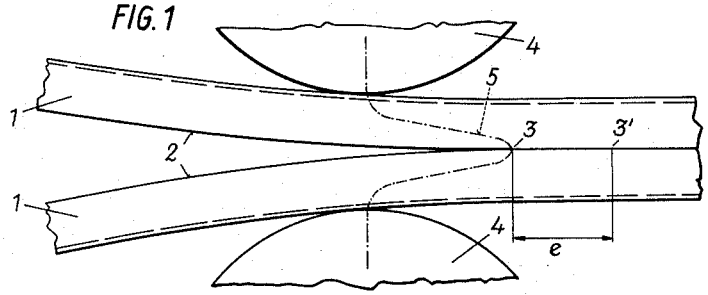

May 5, 1964  A. WÖGERBAUER  3,132,234
PROCESS FOR THE CONTINUOUS MANUFACTURE OF SECTIONS, PARTICULARLY
TUBES AND HOLLOW SECTIONS, AND APPARATUS FOR
CARRYING OUT THE PROCESS
Filed Dec. 8, 1960  5 Sheets-Sheet 2
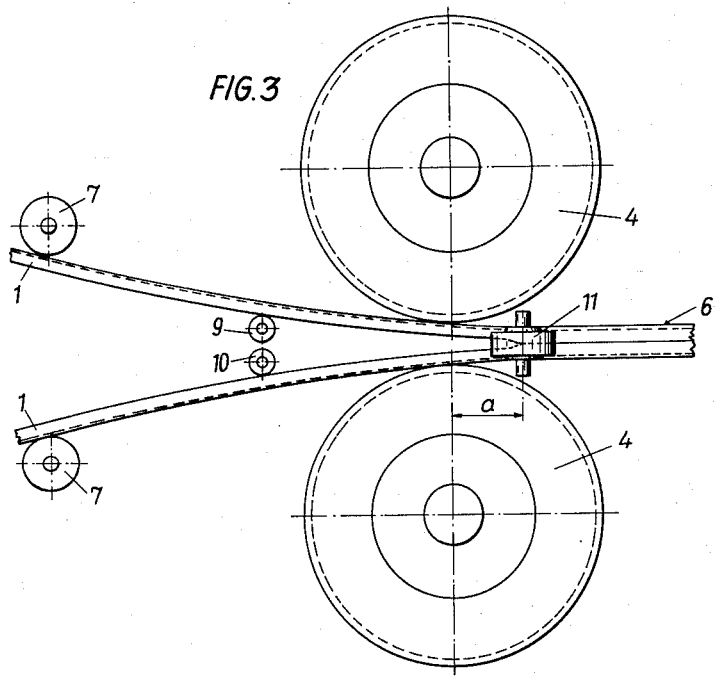
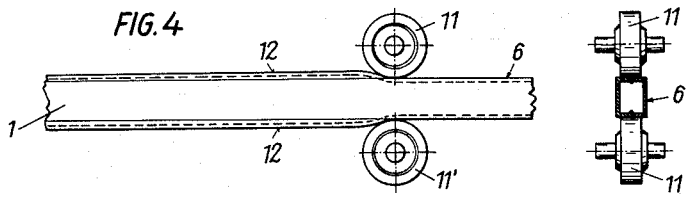
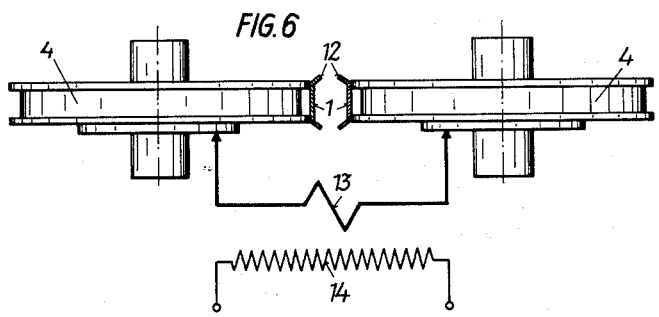
INVENTOR.
ALFRED WÖGERBAUER
BY
HIS ATTORNEYS May 5, 1964

A. WÖGERBAUER 3,132,234

PROCESS FOR THE CONTINUOUS MANUFACTURE OF SECTIONS, PARTICULARLY
TUBES AND HOLLOW SECTIONS, AND APPARATUS FOR
CARRYING OUT THE PROCESS

Filed Dec. 8, 1960

5 Sheets-Sheet 3

INVENTOR.
ALFRED WÖGERBAUER

BY

HIS ATTORNEYS

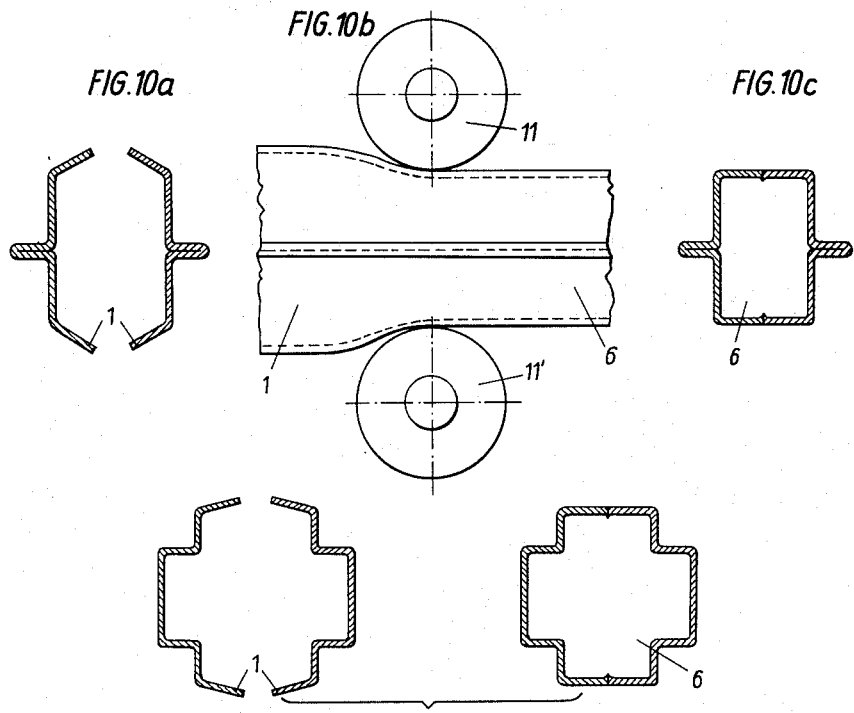
FIG.10a  FIG.10b  FIG.10c
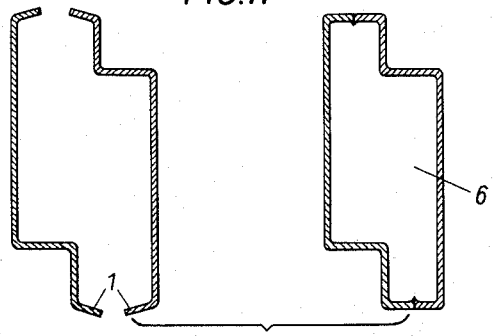
FIG.11
FIG.12
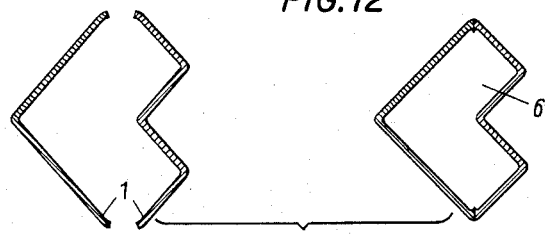
FIG.13
INVENTOR.
ALFRED WÖGERBAUER
HIS ATTORNEYS May 5, 1964 A. WÖGERBAUER 3,132,234
PROCESS FOR THE CONTINUOUS MANUFACTURE OF SECTIONS, PARTICULARLY
TUBES AND HOLLOW SECTIONS, AND APPARATUS FOR
CARRYING OUT THE PROCESS
Filed Dec. 8, 1960 5 Sheets-Sheet 5

INVENTOR.
ALFRED WÖGERBAUER
BY
HIS ATTORNEYS

United States Patent Office 3,132,234
Patented May 5, 1964

3,132,234
PROCESS FOR THE CONTINUOUS MANUFAC-
TURE OF SECTIONS, PARTICULARLY
TUBES AND HOLLOW SECTIONS, AND
APPARATUS FOR CARRYING OUT THE
PROCESS
Alfred Wögerbauer, 9 Greilstrasse, Linz, Austria
Filed Dec. 8, 1960, Ser. No. 74,694
Claims priority, application Austria Dec. 10, 1959
8 Claims. (Cl. 219—67)

The invention relates to a process for the continuous manufacture of sections, particularly of tubes and hollow sections, from pre-shaped component sections. The invention relates also to apparatus for carrying out this process.

It is known to make tubes and other sections from two or several metal strips coiled to form a ring. For this purpose the metal strips are shaped by profile rolls to form component sections, e.g. trough-shaped or angle-shaped sections or slotted tubes, and those edges of the component section which are to be welded are converged to form an elongated notch confined by convex surfaces. At the tip of the notch, the engaging edges are butt-welded to form the desired final shape. The welding operation may be carried out by any desired process, such as by electric arc welding, gas fusion welding, resistance heating (Johnston process). A preferred process is the notch seam welding based on supplying the electric current by conduction or induction, which is known from earlier proposals made by the applicant (Austrian Patent No. 200,889). In these welding processes the electric current flows through the engaging edges at the points where welding is to be carried out. To obtain a uniform seam, the density of the welding current at the points where welding is to be carried out should be as constant as possible. The current density is influenced by various factors. Of the greatest influence on the constancy of the welding current density are changes in the length of the notch or, in other words, variations in the position of the point where the edges engage (tip of welding seam). If the tip of the welding seam migrates opposite to the direction of production, the current density will increase because the path of the current is reduced. If said tip migrates away from the current supply terminals, i.e. in the direction toward the finished final section, the current density will decrease.

There may be various causes for the variations in the position of the tip of the welding seam. For instance, if the component sections emerge from the shaping rolls in a slightly undulated shape owing to a slight eccentricity of the shaping rolls (fit of the shaft in the shaping roll) or other reasons—this undulated shape often cannot be discovered with the naked eye—this will result in variations in the position of the tip of the welding seam when the edges engage.

Another cause is due to the use of hot-rolled sheet steel, which does not move to the welding station with a constant curvature but with slight kinks. This phenomenon also occurs when coils of hot-rolled steel strip are unwound and is then known to the man skilled in the art as "coilbreaks." This phenomenon has previously been obviated by subjecting hot-rolled strip to a single cold-rolling pass. This, however, requires a separate, expensive apparatus. Other causes of the migration of the tip of the welding seam are changes in the width of the starting strip, variations in the dimensions of the component section owing to an alternating left-hand and right-hand tendency of the component section in the shaping rolls, and the like.

These variations in the position of the tip of the welding seam result in variations in the heating of the welding seam and consequently in the unequal quality of the welding seam along the length of the tube.

It is an object of the invention to maintain the tip of the welding seam stationary so that it does not migrate back and forth in the longitudinal direction and the quality of the welding seams is improved. The process according to the invention resides in that the final shaping of the component sections to the desired final shape is carried out in the welding zone, the tip of the notch formed by the engaging edges being shortened and curved according to a sine curve. This shaping in the zone of welding is carried out in such a short length that the tip of the welding seam does not migrate. The process is applicable to one-seam or two-seam round-section tubes as well as to more complex shaped tubes and to hollow sections.

Figure 2:
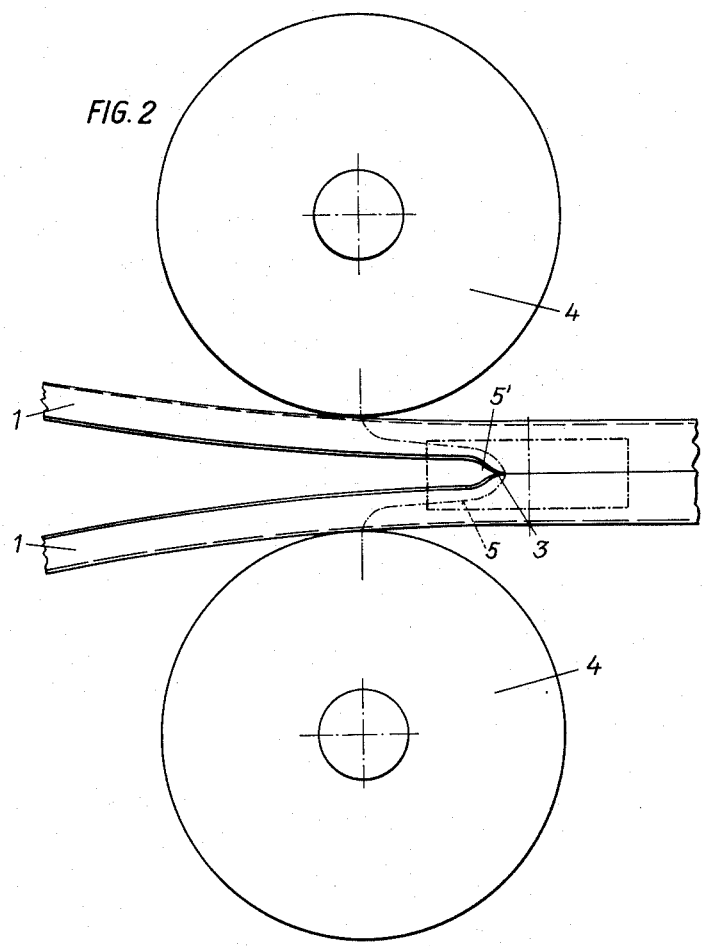
Figure 7A:
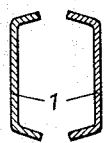
Figure 7B:
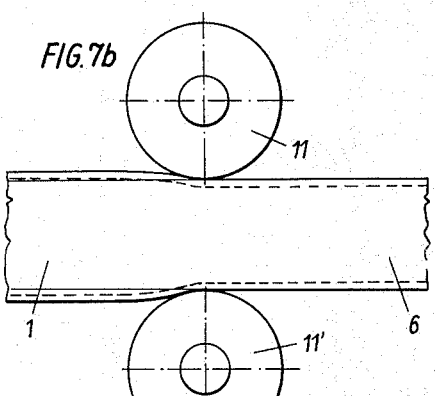
Figure 7C:
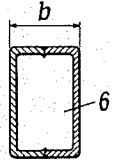

The invention is explained more in detail in the drawings. FIG. 1 explains diagrammatically the shape of the notch obtained with a known process. FIG. 2 illustrates diagrammatically the shape of the notch in the process according to the invention. FIGS. 3 to 6 are a top plan view, side elevation, sectional view and end view showing the zone of welding during the manufacture of a rectangular-section tube from two trough-shaped component sections. The group of FIGURES 7 comprises an enlarged cross-sectional view showing two component sections (FIG. 7a), a side elevation showing the pressure rollers in the zone of welding (FIG. 7b), and a transverse sectional view of the finally produced rectangular-section (FIG. 7c).

Figure 8A:
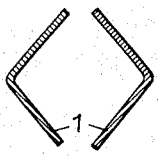
Figure 8B:
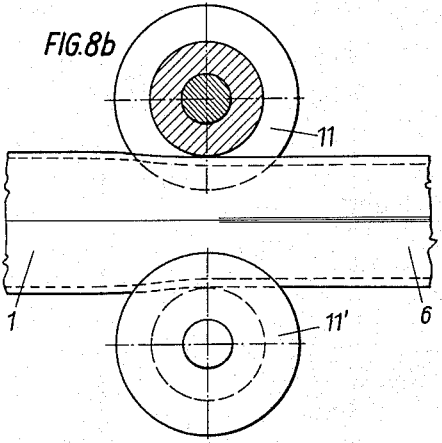
Figure 8C:
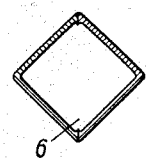
Figure 9A:
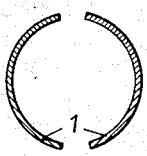
Figure 9B:
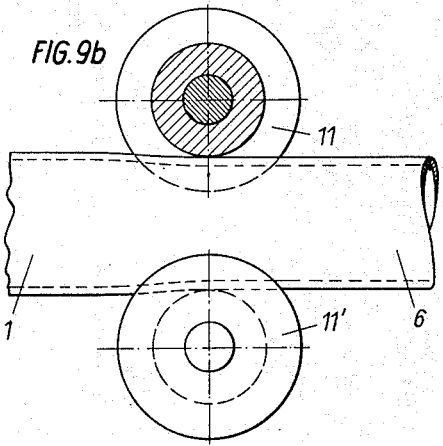
Figure 9C:
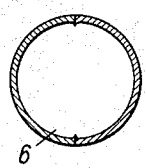
Figure 14:
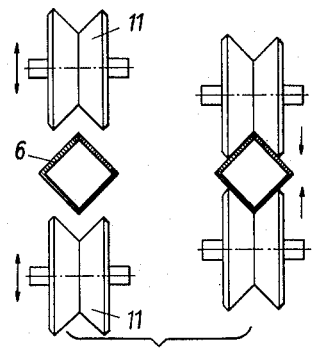
Figure 15:
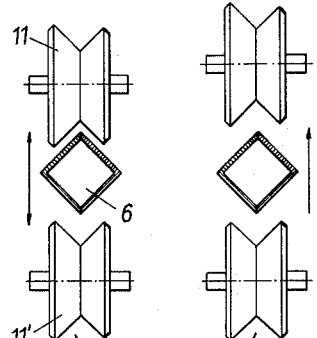
Figure 16:
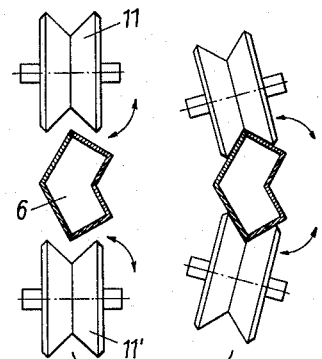
Figure 17:
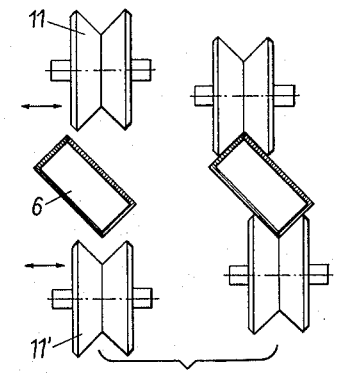

The group of FIGURES 8 is a similar showing for a square-section tube, group of FIGURES 9 for a round-section tube and group of FIGURES 10 for a rectangular-section tube having two rib folds. FIGS. 11, 12 and 13 show component sections and the corresponding final sections having a somewhat more complicated shape.

Figure 18:
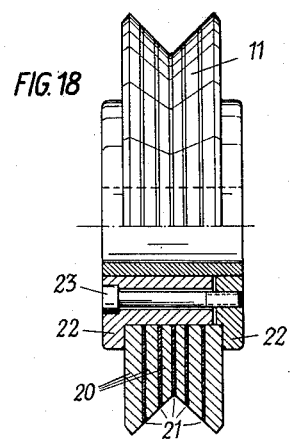
Figure 19:
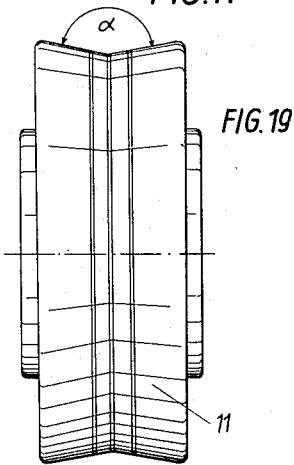

FIGS. 14 to 17 show the shape of the pressure rollers used for the final shaping of the component sections in the zone of welding and various adjustments of these rollers. FIGS. 18 and 19 show details of the construction of the pressure rollers.

In the diagrammatic showing of FIG. 1, two rectangular, U-shaped component sections 1 are seen in top plan. They are converged to form an elongated notch 2 confined by convex surfaces. 3 is the tip of the welding seam. This tip of the welding seam can migrate within the distance $e$ as far as to $3'$ if irregularities occur in the pre-shaping of the sections. 4 are the current supply rollers for the welding current. The path of the welding current is indicated by the dotted line 5.

FIG. 2 is a similar showing illustrating the process according to the invention. Close to the tip 3 in the region $5'$ the notch is confined according to sine curves. According to the invention the length of the notch is reduced and the tip of the welding seam is kept stationary.

In FIGS. 3 to 7 the manufacture of a rectangular-section tube 6 (FIGS. 5 and 7c) is shown. Two trough-shaped component sections 1 (FIGS. 6 and 7a) are brought together at the edges. The component sections are guided by the outer rollers 7, 8 and the inner spacing rollers 9, 10. In the zone of welding, between the contact rollers 4 and the tip of the welding seam, the final shaping is effected by the action of the pair of pressure rollers 11, 11', whereby the flanges 12 of the component sections, which flanges include an obtuse angle with the base of the component section, are forced inwardly to extend at right angles during the welding.

In FIG. 6, numerals 13 and 14 are the primary and secondary windings of the transformer which supply welding current to the contact rollers 4.

FIGS. 8 to 10 are similar showings illustrating the manufacture of square-section tubes, round-section tubes and rectangular-section tubes having rib folds. 1 are the component sections and 6 the final sections. It is common to all these embodiments that the final shaping in the zone of welding is carried out by the action of pressure exerted by the pressure rollers 11, 11', whereby the edges are caused to approach each other, the form of the notch is changed from one having convex to one having sinusoidal boundaries and the position of the tip of the welding seam is thus maintained constant.

FIGS. 11 to 13 show final sections 6 which are of somewhat more complex shape and obtained by welding component sections 1 together. FIG. 11 shows a cruciform-section tube, FIG. 12 a rectangular-section tube having diagonally opposite re-entrant angles, and FIG. 13 a square-section tube having a single re-entrant angle. Such sections are used for special construction purposes, and their manufacture by previous methods was complicated and expensive.

The invention comprises apparatus for carrying out the process which has been described. This apparatus is essentially characterized in that at least one pair of pressure rollers for the final shaping is provided in the zone of welding. Depending on the nature of the desired final section the pressure face of these rollers may be straight (FIG. 5) or profiled or recessed. To enable the formation of complicated cross-sectional shapes as are shown in FIGS. 12 or 13 or similar cross-sectional shapes, the pressure rollers require a considerable freedom of movement. The pairs of rollers must be adjustable forward and backward in the direction of the section to be made. They must be capable of being lifted and lowered. Besides, it is preferred to provide the rollers of one pair of rollers adjustable relative to each other, adjustable laterally, and individually pivotally movable about their respective axes. The various adjustments of the rollers are indicated in FIGS. 14 to 17 by arrows. In these showings the top rollers are designated 11, the bottom rollers 11', and the finished sections 6.

The adjustment of the pressure rollers in the longitudinal direction of the tube must be such that the edges to be welded do not meet before or after the pressure roller but at a point approximately halfway between these two extremes, which constitute limits for the process. In a preferred procedure, the two electrode rollers are adjusted a distance apart which is much larger than would correspond to the dimensions of the component sections and of the finished tube, respectively. In the manufacture of rectangular-section tubes, for instance, it can be adjusted to twice the channel flange width plus the thickness of the strip. The corresponding longitudinal adjustment of the pressure rollers is first preselected by approximation and then empirically corrected to an optimum during operation. With rectangular-section tubes the distance $a$ from the center of the electrode rollers to the center of the pressure roller (in top plan) will be approximately equal to the width $b$ of the finished rectangular-section tube.

The pressure rollers are suitably mounted in a separate pressure roller frame and are adjusted in the longitudinal direction together with this frame, e.g. by screw and nut.

It is inherent in the nature of the welding process according to the invention that the two component sections are at different potentials during the welding. For this reason the pressure rollers must be so shaped that they do not form a shunt for the welding current. In the case of small welding currents (thin tube walls) high-grade ceramics, such as pure $Al_2O_3$, are suitable for the manufacture of the pressure rollers. These materials, however, will not resist higher loads. For this reason an embodiment of the invention provides pressure rollers assembled from metal laminations, which are thinner in the center of the welding seam and increase in thickness towards the outside; they are insulated from each other, e.g. by mica plates. Non-magnetizable material is preferred to ferromagnetic steel as a material for the laminations. Austenitic steels have proved satisfactory. FIG. 18 shows a pressure roller assembled from such layers and used for welding angle joints, e.g. in the manufacture of square-section tubes. The metal laminations are designated 20 and the insulating layers 21. The layers are held together by a hub 22 and a number of screws 23.

The shaping effected by the pressure rollers need not be complete. A residual shaping may be left to advantage to a truing operation which follows the welding. This may be assisted by appropriately shaped pressure rollers as are shown in FIG. 19. The pressure face having the slightly re-entrant angle $\alpha$ causes a cambered profile face to be formed. This has the advantage that the removal of the outer welding ridge, e.g. by planing, is substantially facilitated.

Tubes and sections welded according to the present method have extremely uniform and dense welding seams. The adjustment of the installation in the case of a change of the program is facilitated and the percentage of rejects is much smaller than with known processes.

What I claim is:

1. A process for the continuous manufacture of sections from component sections, comprising bringing together at least one longitudinal edge of a partially pre-shaped component section with at least one longitudinal edge of another partially pre-shaped component section to form a notch, shaping said partially pre-shaped sections to substantially the predetermined final form by pressure exerted in the axial plane through said notch which bends the longitudinal edges of said partially pre-shaped sections substantially through a sine curve as they approach said notch to shorten the tip of said notch, and heating the edges to welding temperature in the substantially fixed zone wherein the tip of said notch is formed to weld them together.

2. A process for the continuous manufacture of sections from component sections, comprising bringing together at least one longitudinal edge of a partially pre-shaped component section with at least one longitudinal edge of another partially pre-shaped component section to form a notch, and resistance-welding the edges facing each other by conductively supplying electric welding current to said sections at a zone spaced a substantially constant distance from said notch, the last step of shaping the component sections being carried out in that region of the edges through which the electric current flows by pressure exerted in the axial plane through said notch which bends the longitudinal edges of said partially pre-shaped sections through a substantially sinusoidal curve as they approach said notch to shorten the tip of the notch formed by the edges.

3. Apparatus for the continuous manufacture of sections, comprising a plurality of feeding and shaping rolls arranged one behind the other for continuously partially shaping component sections and bringing together at least one longitudinal edge of a partly pre-shaped component section with a longitudinal edge of another partly pre-shaped component section to form a notch, and a welding device for welding together the edges of the component sections facing each other, at least one pair of pressure rollers being provided in the zone of welding for applying pressure in the axial plane to said notch, each of said rollers having a pressure surface which corresponds to the shape of the final section to be formed.

4. Apparatus as set forth in claim 3, in which the pair of pressure rollers is adjustable and capable of being lifted and lowered in the longitudinal direction.

5. Apparatus as set forth in claim 3, in which the rollers of a pair of pressure rollers are adjustable relative to each other and laterally, and are pivotally movable.

6. Apparatus as set forth in claim 3, in which the pressure rollers consist of alternating layers of metal laminations of non-magnetizable material and intermediate insulating layers.

7. Apparatus as set forth in claim 6, in which the metal laminations are thinner in the rollers adjacent to the center of the welding seam than in other portions of said rollers.

8. An apparatus for the continuous manufacture of hollow sections comprising means for guiding at least two partly preformed component sections on converging paths to bring at least one edge of one section into spaced, opposed relation to an edge of another section, at least one pair of forming rolls for engaging each of said sections at the edges thereof, said rolls being spaced apart a less distance than the spacing between the edges of each of said sections engaged by said rolls to bend said spaced, opposed edges along substantially sinusoidal curves into engagement with each other to form a welding notch and to form said sections substantially to final shape, current supply electrodes engaging each of said component sections, and means for moving said sections past said electrodes and said forming rolls in succession to weld said sections together where they engage at said notch.

References Cited in the file of this patent

UNITED STATES PATENTS

| | | |
|---|---|---|
| 1,998,139 | Kurtze | Apr. 16, 1935 |
| 2,009,501 | Kurtze | July 30, 1935 |
| 2,047,254 | Burnish | July 14, 1936 |
| 2,075,121 | Lessman | Mar. 30, 1937 |
| 2,136,059 | Sciaky | Nov. 8, 1938 |
| 2,647,981 | Wogerbauer | Aug. 4, 1953 |
| 2,652,474 | Sorenson | Sept. 15, 1953 |
| 2,936,357 | Crawford | May 10, 1960 |
| 2,950,376 | Wogerbauer | Aug. 23, 1960 |

UNITED STATES PATENT OFFICE
CERTIFICATE OF CORRECTION

Patent No. 3,132,234                            May 5, 1964

Alfred Wögerbauer

It is hereby certified that error appears in the above numbered patent requiring correction and that the said Letters Patent should read as corrected below.

Column 1, line 22, for "surfaces," read -- surfaces. --; column 4, line 30, for "substantially through" read -- through substantially --; column 6, line 10, for "Lessman" read -- Lessmann --.

Signed and sealed this 8th day of September 1964.

(SEAL)
Attest:

ERNEST W. SWIDER                                   EDWARD J. BRENNER
Attesting Officer                                        Commissioner of Patents